(12) United States Patent
Nedved et al.

(10) Patent No.: US 12,455,601 B2
(45) Date of Patent: Oct. 28, 2025

(54) MOUNTING SYSTEM FOR STORAGE DRIVE

(71) Applicant: DISH Network L.L.C., Englewood, CO (US)

(72) Inventors: Steven Allen Nedved, Littleton, CO (US); Andrew David McAuley, Lone Tree, CO (US)

(73) Assignee: DISH Network L.L.C., Englewood, CO (US)

( * ) Notice: Subject to any disclaimer, the term of this patent is extended or adjusted under 35 U.S.C. 154(b) by 168 days.

(21) Appl. No.: 18/221,013

(22) Filed: Jul. 12, 2023

(65) Prior Publication Data
US 2025/0021141 A1    Jan. 16, 2025

(51) Int. Cl.
*G06F 1/18* (2006.01)
(52) U.S. Cl.
CPC ................... *G06F 1/187* (2013.01)
(58) Field of Classification Search
CPC ............... G06F 1/187; G11B 33/124
See application file for complete search history.

(56) References Cited

U.S. PATENT DOCUMENTS

| | | | | |
|---|---|---|---|---|
| 8,908,327 B1* | 12/2014 | Li | ........................... | G11B 33/08 360/99.17 |
| 8,971,036 B1* | 3/2015 | Lau | ........................... | G06F 1/20 361/679.34 |
| 2015/0316964 A1* | 11/2015 | Albert | ..................... | H05K 7/18 211/41.12 |

* cited by examiner

Primary Examiner — James Wu
(74) Attorney, Agent, or Firm — Wash Park IP Ltd.; John T. Kennedy

(57) ABSTRACT

A mounting system for a storage drive includes a mounting bracket and a plurality of fasteners. The mounting bracket includes a first sidewall and a second sidewall, parallel to and spaced apart from the first sidewall. Each of the first and second sidewalls defines a plurality of apertures therein, spaced apart from one another and configured to align with corresponding threaded mounting apertures defined within the storage drive. The fasteners are positioned within apertures of the first and sidewalls. Each fastener has a head end and a distal end separated by a shaft having a first diameter. The distal end of each fastener is formed as a pin of a second diameter smaller than the first diameter and sized for linear, axial insertion within the corresponding threaded mounting apertures for an interference fit.

19 Claims, 9 Drawing Sheets

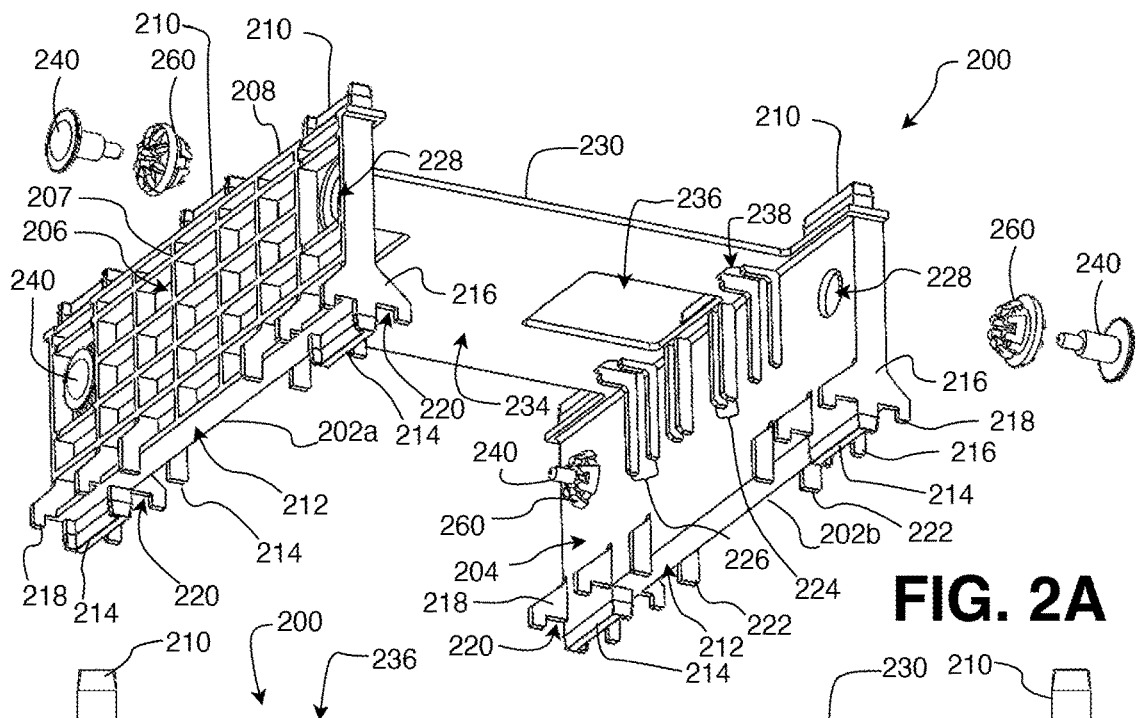
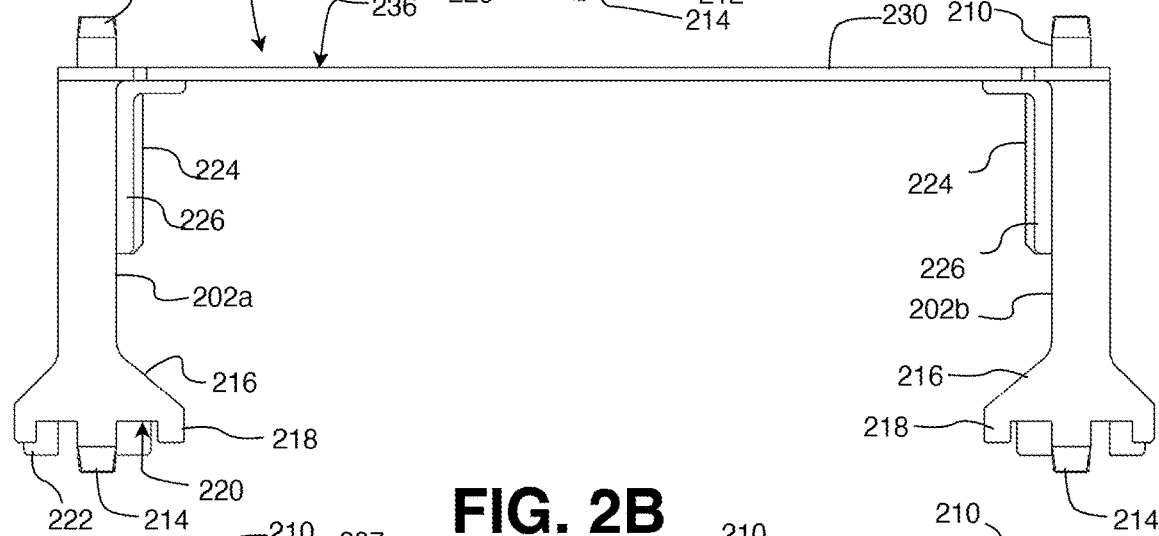
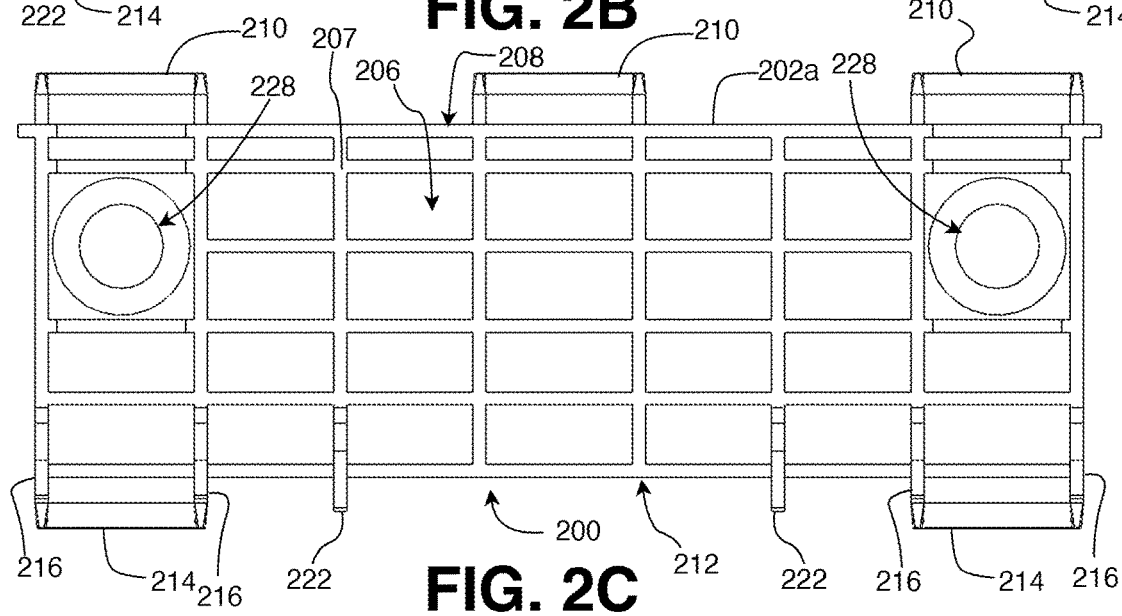

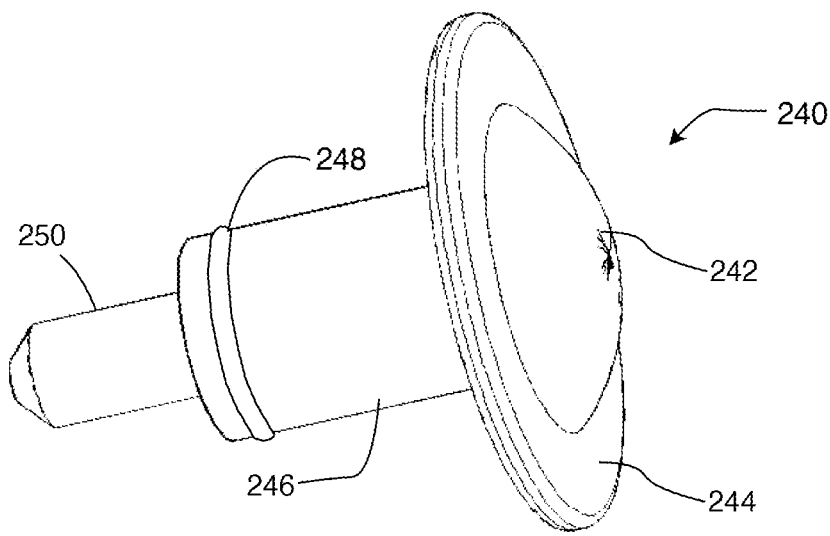
FIG. 3
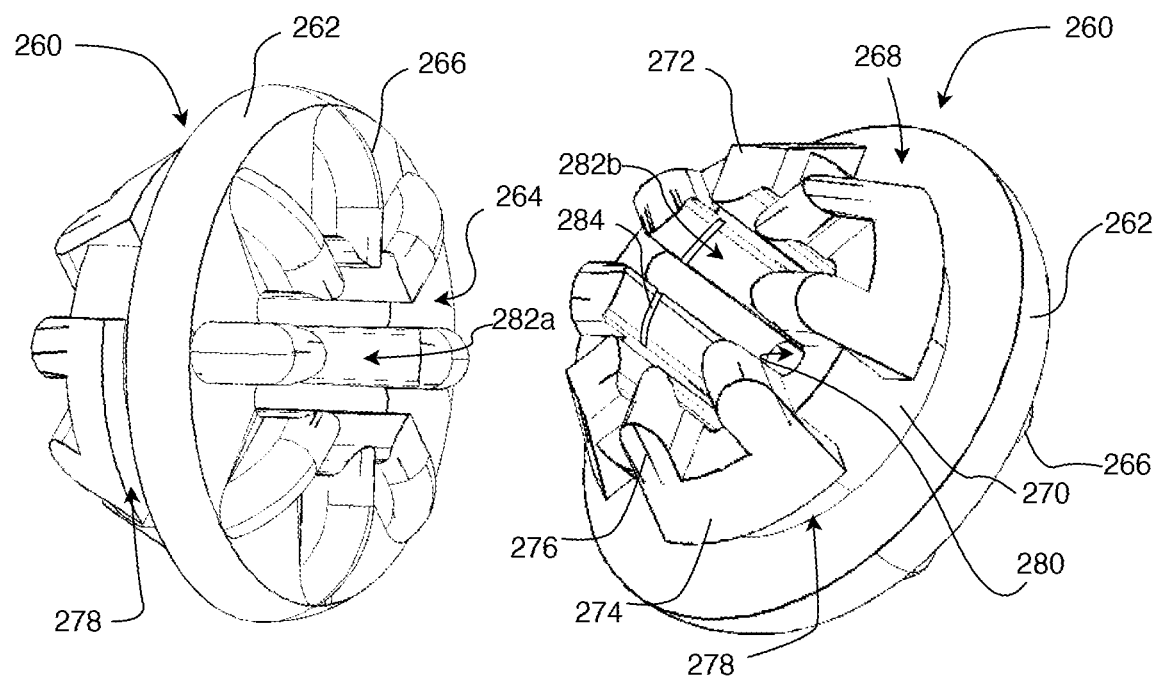
FIG. 4A  FIG. 4B

MOUNTING SYSTEM FOR STORAGE DRIVE

TECHNICAL FIELD

The subject matter described herein relates to systems and structures for mounting a storage drive within a housing of an electronic device.

BACKGROUND

Storage drives for storing digital data of all types are often mounted internally within housings of computing devices. Many storage drives are made in similar dimensional form factors with congruent mounting structures to allow for different models of storage drives to be substituted for others. This can be important during manufacturing as multiple manufacturers of storage drives may be contracted by the device manufacturer to provide storage drives to meet production needs or generally diversify the supply chain. In addition, storage drives can fail and may need to be replaced within computing devices by technicians or consumers. Typically, storage drives include threaded mounting apertures within their casing at uniform, and often industry-standard, locations that allow the storage drive to be fastened with screws to a mounting structure, e.g., a frame on a circuit board or another structure within or as part of a housing of the computing device. However, screwing storage drives to other structures to secure them in place, or remove them, is time consuming and can be difficult if clearances are small. Further, the screws are typically tiny and can be easily dropped and lost.

The information included in this Background section of the specification, including any references cited herein and any description or discussion thereof, is included for technical reference purposes only and is not to be regarded subject matter by which the scope of the invention as defined in the claims is to be bound.

SUMMARY

In accordance with at least one implementation of the present disclosure a mounting system, for a storage drive, includes a mounting bracket and a plurality of fasteners. The mounting bracket includes a first sidewall and a second sidewall, parallel to and spaced apart from the first sidewall. The first sidewall and the second sidewall define a plurality of apertures therein, spaced apart from one another and configured to align with corresponding threaded mounting apertures defined within the storage drive. The plurality of fasteners positioned within respective ones of the plurality of apertures of the first sidewall and the second sidewall, each fastener having a head end and a distal end separated by a shaft having a first diameter. The distal end of each fastener is formed as a pin of a second diameter smaller than the first diameter sized for linear, axial insertion within one of the corresponding threaded mounting apertures for an interference fit.

In accordance with at least one implementation of the present disclosure, the mounting system further includes a saddle extending between the first sidewall and the second sidewall which defines a spatial separation between the first sidewall and the second sidewall.

In accordance with at least one implementation of the present disclosure, the mounting system further includes a first set of counterforts positioned along a first interface between the saddle and the first sidewall and a second set of counterforts positioned along a second interface between the saddle and the second sidewall. The first and second sets of counterforts provide reinforcement to the first interface and the second interface.

In accordance with at least one implementation of the present disclosure, the mounting system further includes a first set of buttresses extending inward from the first sidewall toward a position of a storage device and a second set of buttresses extending inward from the second sidewall toward the position of a storage device. The first and second sets of buttresses are sized to engage opposing sides of the storage device while the first sidewall and the second sidewall maintain a parallel relationship and constant separation distance.

In accordance with at least one implementation of the present disclosure, the mounting system further includes a plurality of grommets, each of the grommets seated within respective ones of the plurality of apertures of the first sidewall and the second sidewall; wherein each of the plurality of grommets defines a conduit through which a respective one of the plurality of fasteners extends such that the shaft seats within the conduit and the pin extends beyond a distal end of the grommet.

In accordance with at least one implementation of the present disclosure, the grommets are formed of a resilient material.

In accordance with at least one implementation of the present disclosure, the grommets resist shock and vibrationally isolate the storage drive from the mounting bracket.

In some aspects, the techniques described herein relate to a mounting system for a storage drive of a computing device including: a housing cover defining a plurality of first receiving slots; a housing base defining a plurality of second receiving slots; a mounting bracket including: a first sidewall and a second sidewall, parallel to and spaced apart from the first sidewall, wherein the first sidewall and the second sidewall define a plurality of apertures therein, spaced apart from one another and configured to align with corresponding threaded mounting apertures defined within the storage drive; a plurality of first tabs extending from a top edge of the first sidewall and a top edge of the second sidewall, wherein the first tabs are positioned to align with and seat within corresponding ones of the first receiving slots; and a plurality of second tabs extending from a bottom edge of the first sidewall and a bottom edge of the second sidewall, wherein the second tabs are positioned to align with and seat within corresponding ones of the second receiving slots; and a plurality of fasteners, positioned within respective ones of the plurality of apertures of the first sidewall and the second sidewall, each fastener having a head end and a distal end separated by a shaft having a first diameter; wherein the distal end of each fastener is formed as a pin of a second diameter smaller than the first diameter sized for linear, axial insertion within one of the corresponding threaded mounting apertures for an interference fit.

In accordance with at least one implementation of the present disclosure, the mounting system further includes a saddle extending between the first sidewall and the second sidewall which defines a spatial separation between the first sidewall and the second sidewall.

In accordance with at least one implementation of the present disclosure, the mounting system further includes a first set of counterforts positioned along a first interface between the saddle and the first sidewall and a second set of counterforts positioned along a second interface between the saddle and the second sidewall. The first and second sets of counterforts provide reinforcement to the first interface and the second interface.

In accordance with at least one implementation of the present disclosure, the mounting system further includes a first set of buttresses extending inward from the first sidewall toward a position of a storage device and a second set of buttresses extending inward from the second sidewall toward the position of a storage device, wherein the first and second sets of buttresses are sized to engage opposing sides of the storage device while the first sidewall and the second sidewall maintain a parallel relationship and constant separation distance.

In accordance with at least one implementation of the present disclosure, the mounting system further includes a plurality of grommets, each of the grommets seated within respective ones of the plurality of apertures of the first sidewall and the second sidewall. Each of the plurality of grommets defines a conduit through which a respective one of the plurality of fasteners extends such that a shaft seats within the conduit and the pin extends beyond a distal end of the grommet.

In accordance with at least one implementation of the present disclosure, the grommets are formed of a resilient material.

In accordance with at least one implementation of the present disclosure, the grommets resist shock and vibrationally isolate the storage drive from the mounting bracket, the housing cover, and the housing base.

In accordance with at least one implementation of the present disclosure, one or more of the housing cover and the housing base further includes a fastener retainer extending therefrom and positioned to interface with the head of one of the fasteners to prevent axial movement of the fastener.

In accordance with at least one implementation of the present disclosure, the first sidewall and the second sidewall are further formed with a plurality of tabs sized and positioned to interface with a bottom surface of the base housing to provide lateral support to the first sidewall and the second sidewall when the second tabs seat within the second receiving slots.

In some aspects, the techniques described herein relate to a method for mounting a storage drive within a housing of a computing device. A storage drive is provided with a plurality of threaded mounting apertures defined within opposing sidewalls of the storage drive. A mounting bracket is provided including a first sidewall and a second sidewall, parallel to and spaced apart from the first sidewall. The first sidewall and the second sidewall define a plurality of apertures therein, spaced apart from one another and configured to align with corresponding threaded mounting apertures defined within the storage drive. Each of a plurality of fasteners is inserted within respective ones of the plurality of apertures of the first sidewall and the second sidewall. Each fastener has a head end and a distal end separated by a shaft having a first diameter. The distal end of each fastener is formed as a pin of a second diameter smaller than the first diameter. Each pin of the plurality of fasteners is pushed axially within one of the corresponding threaded mounting apertures of the storage drive for an interference fit.

In accordance with at least one implementation of the present disclosure, the method further includes inserting each of a plurality of grommets to seat within respective ones of the plurality of apertures of the first sidewall and the second sidewall. Each of the plurality of grommets defines a conduit through which a respective one of the plurality of fasteners extends such that the shaft seats within the conduit and the pin extends beyond a distal end of the grommet.

In accordance with at least one implementation of the present disclosure, a first set of buttresses extends inward from the first sidewall toward a position of a storage device and a second set of buttresses extends inward from the second sidewall toward the position of a storage device. The first and second sets of buttresses are sized to engage opposing sides of the storage device while the first sidewall and the second sidewall maintain a parallel relationship and constant separation distance. The method further includes holding the storage drive between the buttresses while inserting the plurality of fasteners and pushing respective pins.

In accordance with at least one implementation of the present disclosure, the method further includes providing a housing including a housing cover defining a plurality of first receiving slots and a housing base defining a plurality of second receiving slots. A top edge of the first sidewall and a top edge of the second sidewall include a plurality of first tabs extending therefrom and positioned to align with corresponding ones of the first receiving slots. A bottom edge of the first sidewall and a bottom edge of the second sidewall include a plurality of second tabs extending therefrom and positioned to align with corresponding ones of the second receiving slots. The method further includes seating the plurality of first tabs within corresponding ones of the first receiving slots; and seating the plurality of second tabs within corresponding ones of the second receiving slots.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. A more extensive presentation of features, details, utilities, and advantages of the present invention as defined in the claims is provided in the following written description of various embodiments and implementations and illustrated in the accompanying drawings.

BRIEF DESCRIPTION OF THE DRAWINGS

The disclosure will be readily understood by the following detailed description in conjunction with the accompanying drawings. In at least one instance, common reference numerals designate common structural elements.

The use of contour lines, shading, or stippling in the accompanying figures is generally provided indicate surface features, including curved surfaces or changes in depth, to clarify boundaries between adjacent elements, and to facilitate legibility of the figures. Accordingly, neither the presence nor the absence of cross-hatching, contour lines, shading, or stippling conveys or indicates any preference or requirement for particular materials, material properties, element proportions, element dimensions, commonalities of similarly illustrated elements, or any other characteristic, attribute, or property for any element illustrated in the accompanying figures.

Additionally, the proportions and dimensions (either relative or absolute) of the various features and elements (and collections and groupings thereof) and the boundaries, separations, and positional relationships presented therebetween, are provided in the accompanying figures merely to facilitate an understanding of the various non-limiting implementations described herein and, accordingly, may not be presented or illustrated to scale, and do not indicate any preference or requirement for an illustrated implementation to the exclusion of other implementations described with reference thereto.

Figure 1:
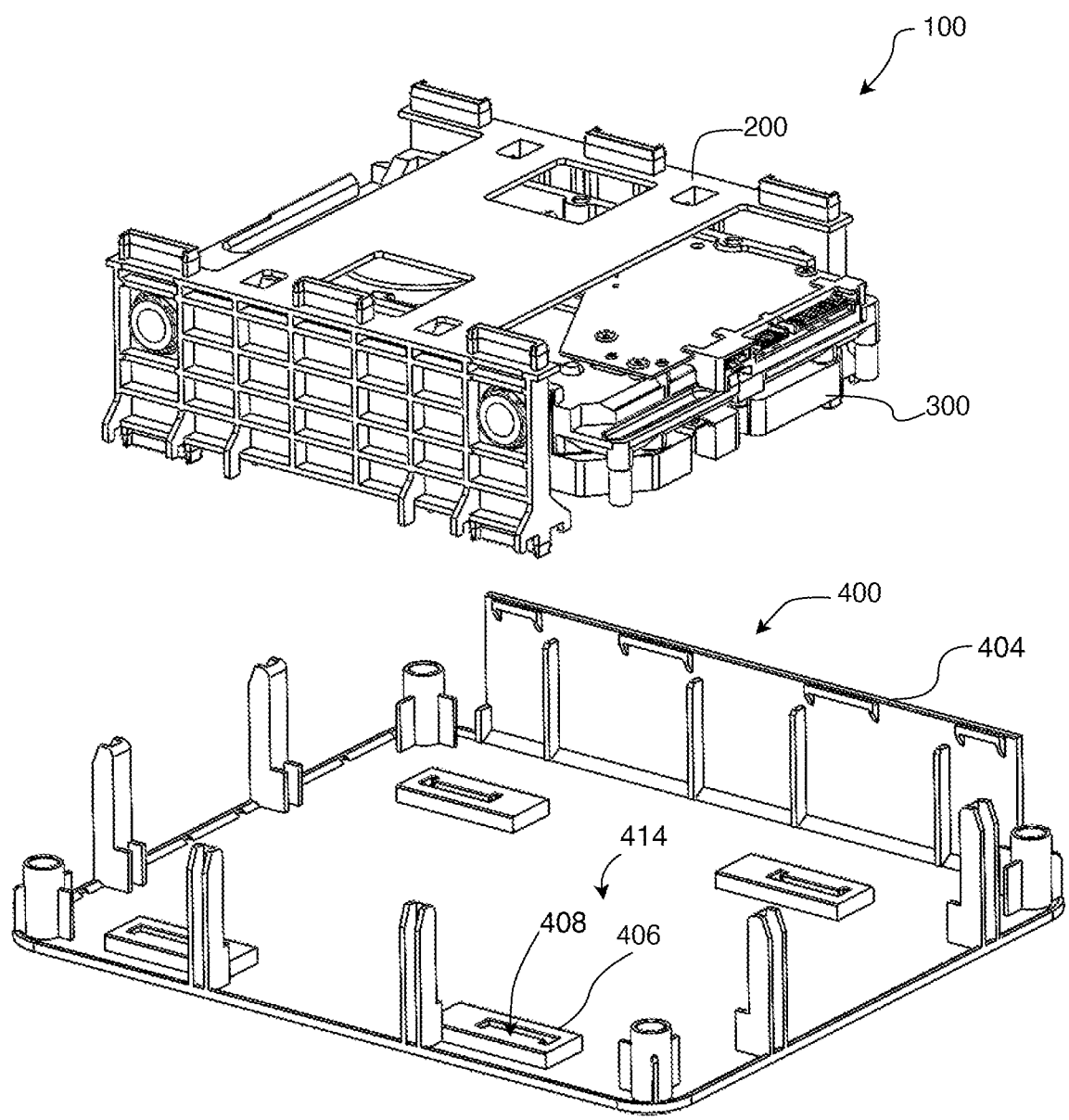

FIG. 1 is an exploded isometric view of an example implementation of a mounting system for a storage drive designed for installation on a cooperative housing base.

FIG. 2A is a front, bottom isometric view of the example implementation of the mounting system of FIG. 1 for a storage drive with various fasteners therefore depicted in an exploded format.

FIG. 2B is a front elevation view of the example implementation of the mounting system of FIG. 2A without fasteners.

FIG. 2C is a left side elevation view (to which the right side elevation is identical) of the example implementation of the mounting system of FIG. 2A without fasteners.

Figure 2D:
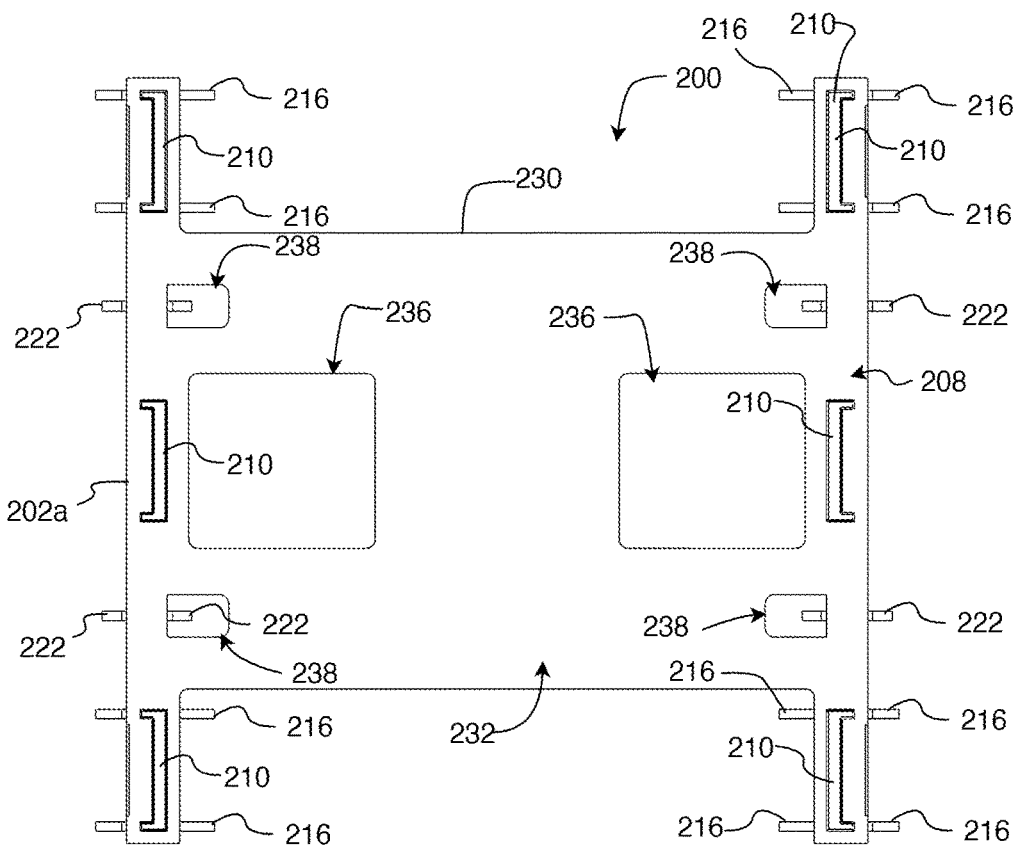

FIG. 2D is top plan view of the example implementation of the mounting system of FIG. 2A without fasteners.

Figure 2E:
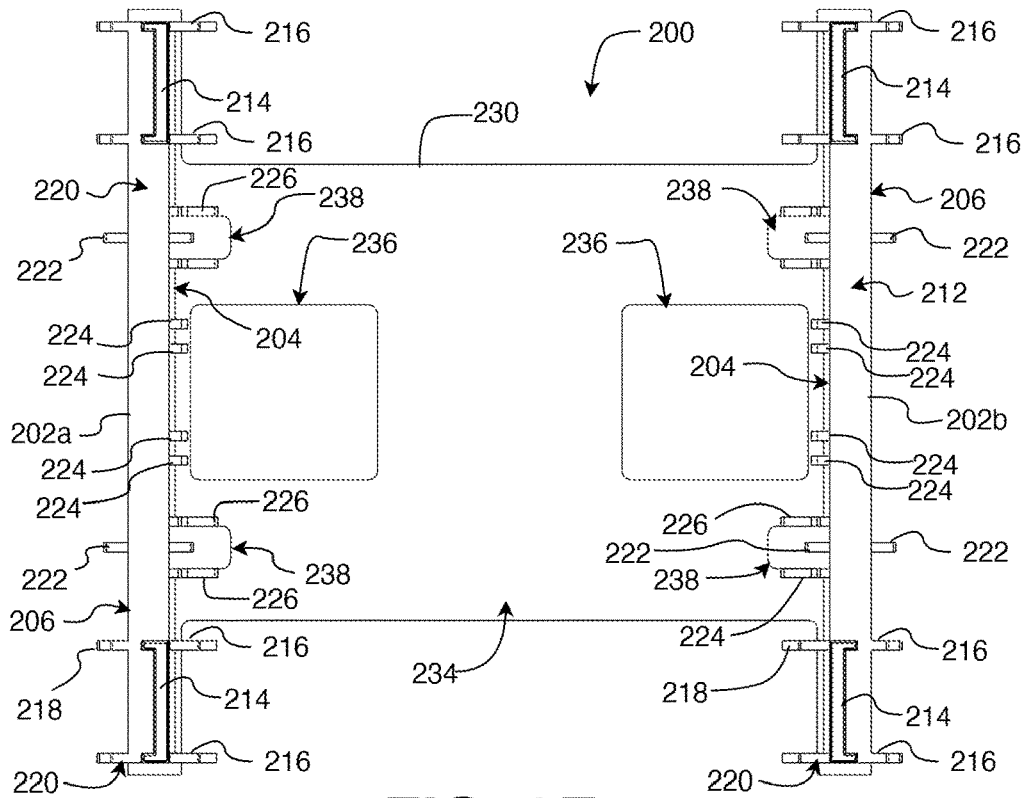

FIG. 2E is a front elevation view of the example implementation of the mounting system of FIG. 2A without fasteners.

FIG. 3 is an isometric view of an example fastener for mounting a storage drive within the mounting system.

FIG. 4A is a front isometric view of an example grommet for use with a fastener for mounting a storage drive within the mounting system.

FIG. 4B is rear isometric view of the grommet of FIG. 4A.

Figure 5:
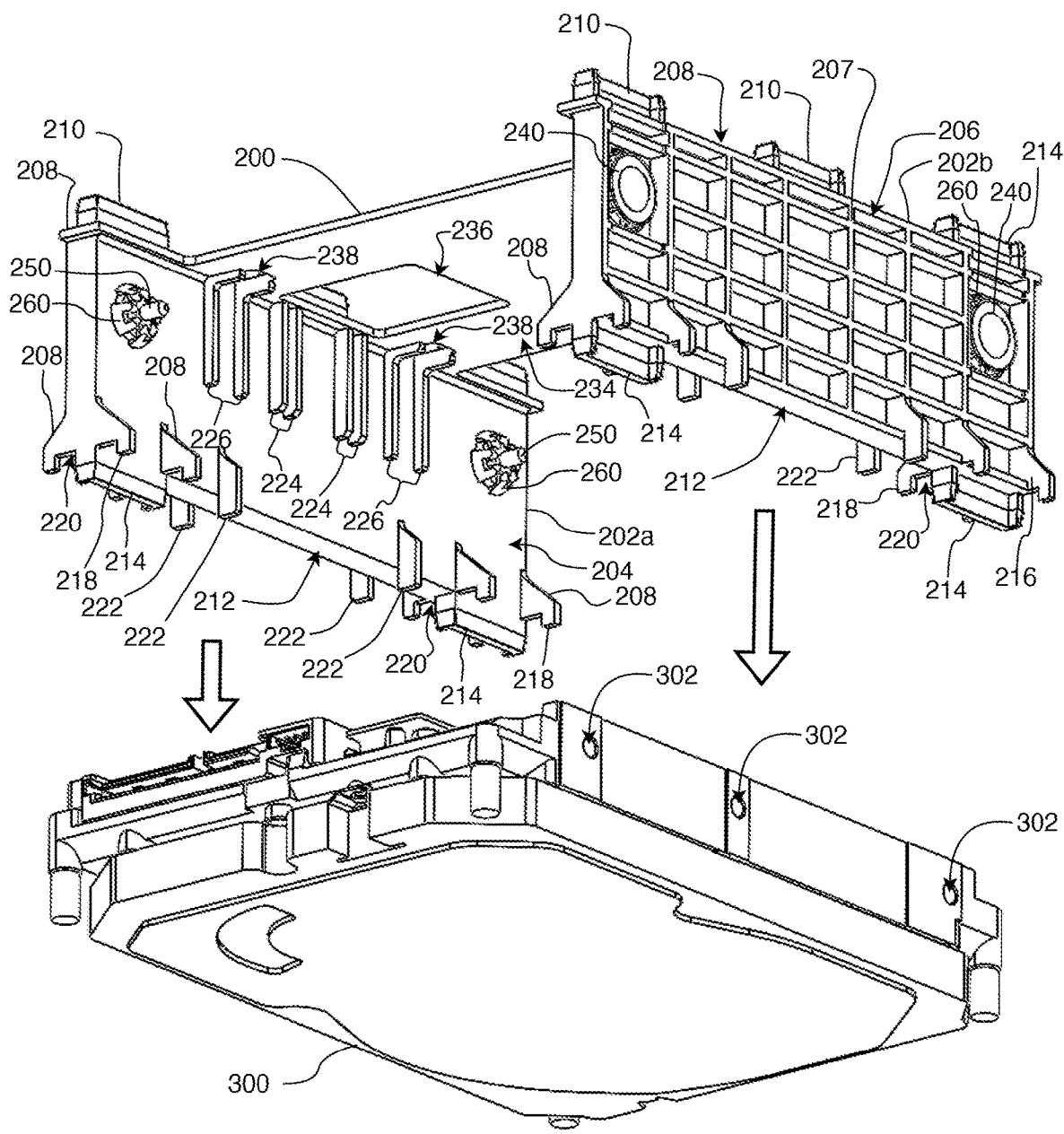

FIG. 5 is an exploded isometric view of the example implementation of the mounting system of FIG. 2A with a corresponding storage drive for mounting therewith.

Figure 6A:
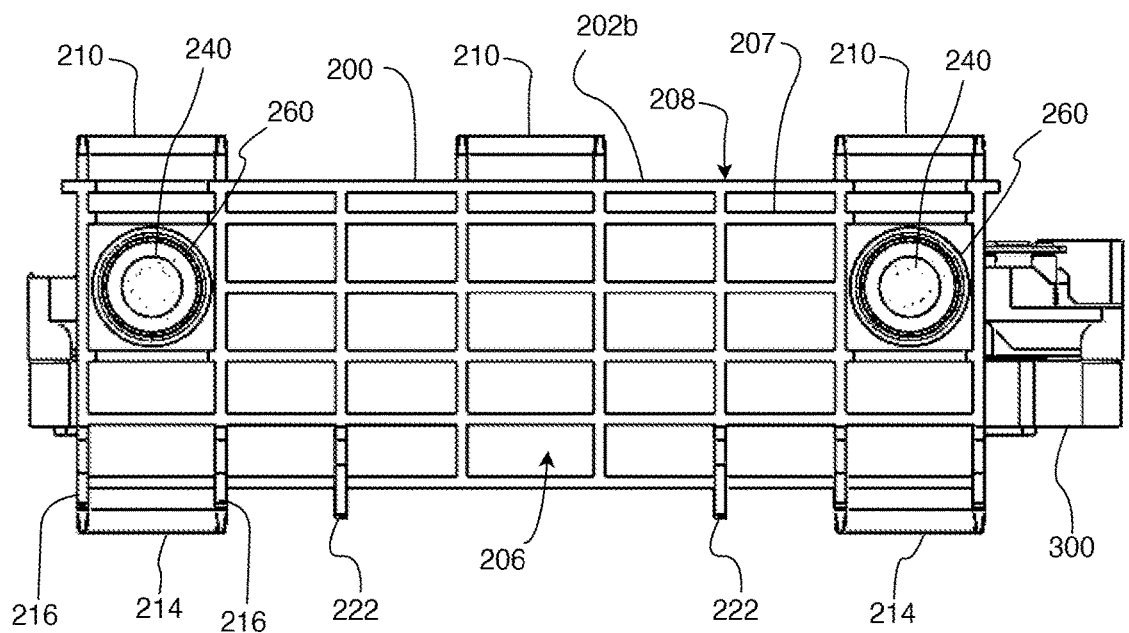

FIG. 6A is a left side elevation view of the example implementation of the mounting system of FIG. 2A with a storage drive mounted therein.

Figure 6B:
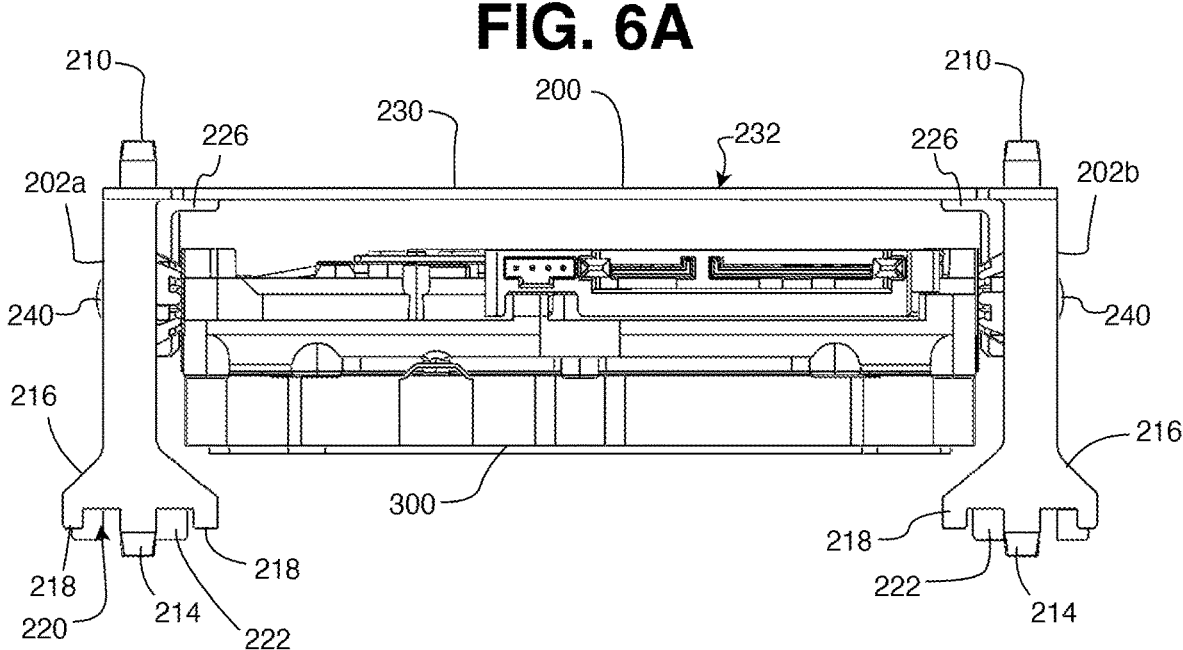

FIG. 6B is a front elevation view of the example implementation of the mounting system of FIG. 2A with a storage drive mounted therein.

Figure 7:
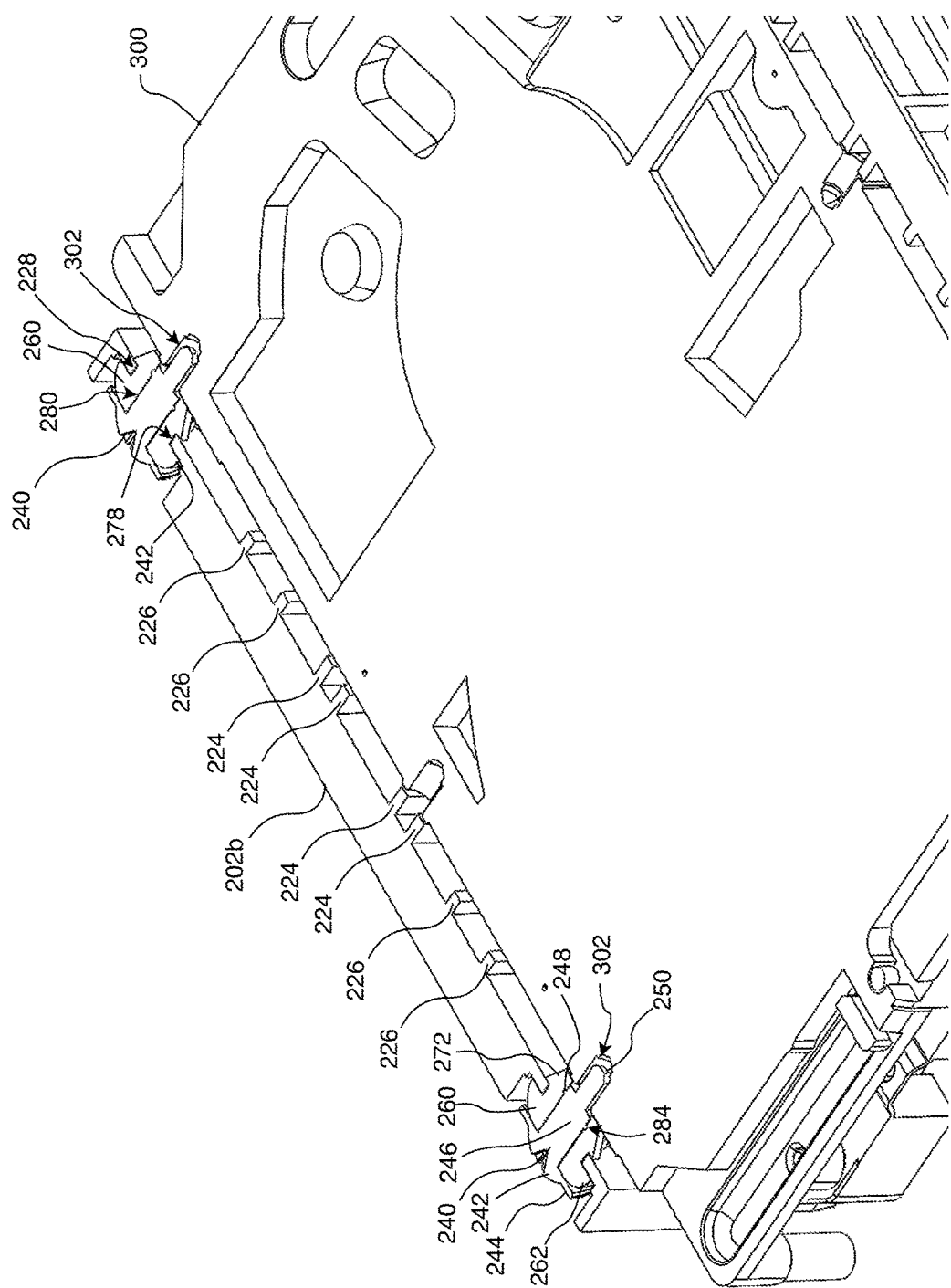

FIG. 7 is a top, front, right, isometric view in cross section of the example implementation of the mounting system of FIG. 2A with a storage drive mounted therein.

Figure 8A:
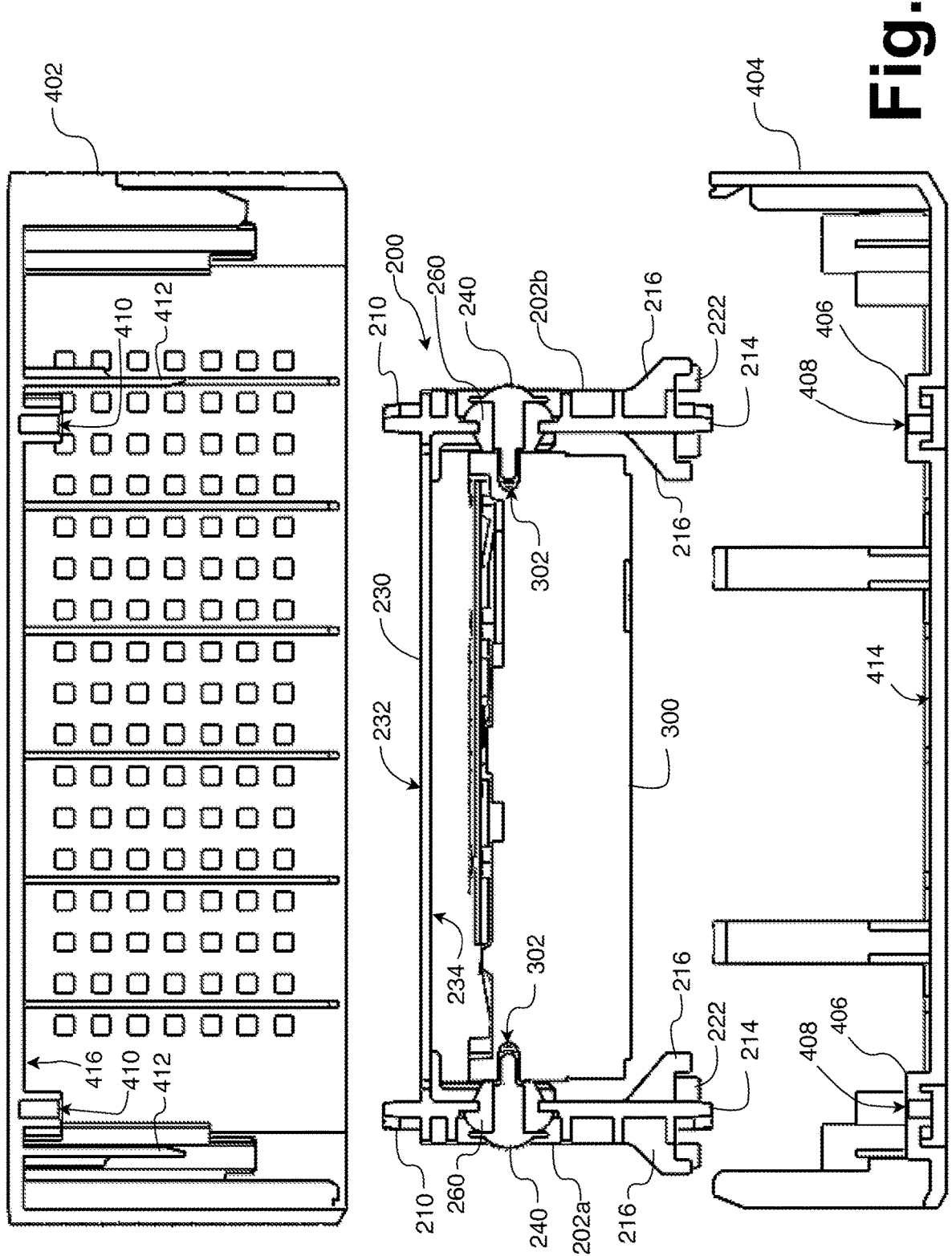

FIG. 8A is a partially exploded front elevation view of the mounting system of FIG. 2A with a storage drive mounted therein and positioned between a cover and a base of a housing.

Figure 8B:
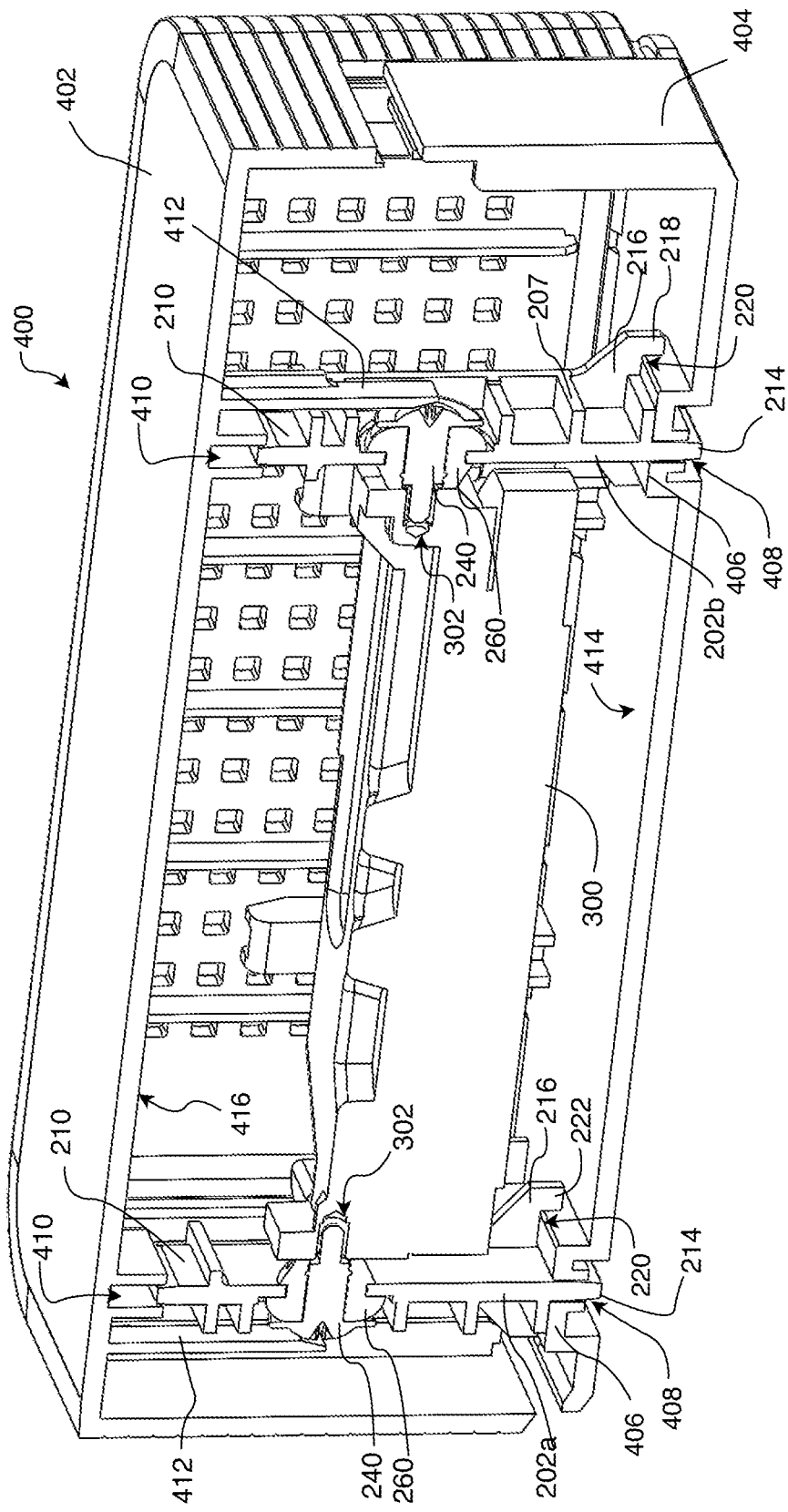

FIG. 8B is front, right, isometric view in cross section of the mounting system of FIG. 2A with a storage drive mounted therein and seated between a cover and a base of a housing.

DETAILED DESCRIPTION

A mounting system for a storage drive used in a computing device is disclosed herein. The mounting system can be adapted for used in any type of computing device that includes a storage drive within a housing. Example computing devices may include desktop computers, laptop computers, server computers, gaming consoles, cable and satellite television set top boxes, and any other computing device which incorporates within its housing a storage drive with standard mounting fixtures to allow for removal and replacement of the storage drive within the housing. Storage drives typically have known read/write duty cycles and, if they are used extensively, may wear out before the useful lifetime of the computing device. In addition, storage drives can fail before their anticipated end of life, particularly hard disk drives spun by electric motors. In either case, it is desirable to be able to easily remove and replace such storage drives within the housing of the computing device.

Storage drives are commonly manufactured to have standard dimensions with standard mounting fixtures or structures to aid original installation as well as replacement within a variety of computing devices with removable housings. For example, solid state storage drives are manufactured to the same dimensional sizes as motor-driven, spinning hard disk drives, even though they need not be the same size or similar form factor, to allow for ease of replacement of one type of storage drive technology with another.

Typical mounting fixtures on storage drives are a plurality of threaded apertures within a case or frame of the storage drive. The threaded apertures are usually provided on two opposing sidewalls of the frame of the storage drive at standard locations and spacing. The threaded apertures are designed to receive machine screws of a common diameter and thread spacing. The screws extend through mounting structures, typically fixed within the housing of the computing device and are then screwed into the threaded apertures of the frame of the storage device to fix the storage device to the housing or other structure of the computing device.

An example implementation of a drive mount system 100 for a storage drive 300 is depicted in FIG. 1 and includes mounting bracket 200 that connects to the standard threaded apertures of the storage drive 300. The mounting bracket 200 is also designed in conjunction with the housing 400 of the computing device to facilitate ease of positioning and mounting of the storage drive 300 within the computing device. The drive mount system 100, its components, and installation of the same within a computing device are disclosed within the further description and corresponding figures of this document.

The example implementation of the mounting bracket 200 is depicted in isolation and in detail in FIGS. 2A-2E. The mounting bracket 200 is formed of two opposing, symmetrical sidewalls 202a, 202b (collectively referenced herein as sidewalls 202) connected by a planar saddle 230. Each of the sidewalls 202 has an interior face 204 and an exterior face 206. In the example implementation, the exterior face 206 may be covered by a grid or framework 207 of intersecting rib structures extending normally from the exterior face. In various implementations, the mounting bracket 200 may be formed by injection molding of plastic and the framework 207 may be incorporated into the design of the sidewalls 202 to provide added strength, rigidity, and resistance to torsional loads.

Each of the sidewalls 202 may have a top edge 208 and a bottom edge 212. One or more top tabs 210 may extend from each top edge 208, in this example implementation, in a common plane with each respective sidewall 202. In this example, there are three top tabs 210 on each sidewall 202, with two positioned adjacent to lateral ends of each sidewall 202, and the third positioned about the middle of the sidewall, equidistant from the two lateral counterparts. However, there could be greater or fewer top tabs 210 at various positions along the top edges 208 of the sidewalls 202. Similarly, one or more bottom tabs 214 may extend from each bottom edge 212, in this example implementation, in a common plane with the respective sidewall 202. In this example, there are two bottom tabs 214 on each sidewall 202 positioned adjacent to lateral ends of each sidewall 202. However, there could be greater or fewer bottom tabs 214 at various positions along the bottom edges 212 of the sidewalls 202. In this example implementation, the top tabs 210 and the bottom tabs 214 are generally rectangular and planar in form, but each can be formed in any other configuration which mates with a corresponding structure as further described below. As depicted in this example, the lateral ends of the top tabs 210 and bottom tabs 214 bend at 90° angles to form a rectangular trough.

Corresponding pedestals 216 may be formed on each longitudinal end of the bottom tabs 214. The pedestals 216 may extend normally with respect to the plane of the respective sidewall 202 from both the interior face 204 and the exterior face 206. The pedestals 216 thus for an end cap for each longitudinal end of the bottom tabs 214. The pedestals 216 can further form pedestal tabs 218 that extend downward from the lateral, distal ends of the pedestals 216 to form recesses, referenced herein as pedestal rabbets 220, between the pedestal tabs 218 and the bottom tabs 214.

In addition to the pedestals 216 set-off tabs 222 may also be formed on and extend from the bottom edges 212 of the sidewalls 202. In this example implementation, the set-off tabs 222 are formed as flat blades extending normally from each of the interior face 204 and exterior face 206 of the sidewalls 202. In the example, there are two sets of set-off tabs 222 positioned along each sidewall between each of the bottom tabs at the lateral ends of the sidewalls 202. However, greater, fewer, or no set-off tabs 222 may be provided.

Each of the sidewalls 202 also defines two or more fastener apertures 228. The fastener apertures 228 may be spaced apart and positioned along each sidewall to align with standard mounting fixture locations on a storage drive 300.

The sidewalls 202 may further be formed with a plurality of buttresses 224 on the interior faces 204. For at least one implementation, the buttresses 224 extend normally from the interior faces 204 as planar blades. The buttresses 224 also extend vertically along the sidewalls 202 parallel to each other.

As noted above, in the example implementation, the sidewalls 202 are connected to each other by a saddle 230, which may be unitarily molded with the sidewalls 202 to maintain a separation distance and parallel relationship between the sidewalls 202. The saddle 230 may be formed as a planar structure with top surface 232 and a bottom surface 234. The sidewalls 202 may extend normally downward from two lateral, parallel edges of the saddle 230. The interface between each of sidewalls 202 and the saddle 230 may be reinforced by a plurality of counterforts 226 unitarily molded with the mounting bracket 200. The counterforts 226 in the example are formed as L-shaped brackets extending normally from each of the interior faces 204 and the bottom surfaces 234 of the saddle 230 as planar blades.

The saddle 230 may further define one or more apertures to provide clearance for components of the storage drive or of the computing device, or to otherwise provide windows for visualization beneath the saddle 230. In the example implementation, various clearance apertures 236 and alignment apertures 238 are depicted. In this implementation, the alignment apertures 238 are positioned between pairs of counterforts 226 and above the set-off tabs 222 extending from the interior faces 204 of the sidewalls 202.

A storage drive 300 may be attached to the mounting bracket 200 using fasteners 240. An example implementation of a fastener 240 is depicted in FIG. 3. The design of fastener 240 may be similar to a machine screw in fom factor, but different in other respects. The fastener 240 has a domed head 242 surrounded by a flat, annular flange 244. A cylindrical shaft 246 of a first diameter extends normally from a base of the head 242. An annular detent 248 is formed on an outer surface of the shaft 246 at a position distal from the head 242. A cylindrical pin 250 extends distally from a distal end of the shaft 246. The pin 250 is axially aligned with the shaft 246 and is of a smaller diameter than the diameter of the shaft 246. The diameter of the pin 250 is selected to fit snugly within the threaded apertures of the mounting fixtures on the frame of a storage drive 300. However, the outer surface of the pin 250 is not threaded. The distal tip of the pin 250 may be beveled as shown in FIG. 3 to aid alignment for insertion. In at least one implementation, the fastener 240 may be machined out of metal such as stainless steel, titanium, brass, or other hard, corrosion-resistant metal.

An example implementation of a grommet 260, as shown in detail in FIGS. 4A and 4B, can be used in conjunction with the fastener 240 to provide structural attachment between the fastener 240 and the sidewalls 202 of the mounting bracket 200. The example grommet 260 may be formed of rubber or other resilient elastomeric material, e.g., by casting or molding. The features of the grommet 260 may be formed on and about a disk-shaped base 262 with an outer surface 264 and an inner surface 268. A conduit 280 may be formed through the thickness between the outer surface 264 and the inner surface 268 of the disk-shaped base 262 at the axial center thereof. A plurality of radial ridges 266 separated from each other may be formed on and extend above the outer surface 264. An inner edge 282a of each radial ridge 266 may extend radially inward beyond the largest diameter of the conduit 280.

An annular wall 270 may extend outward from the inner surface 268 of the disk-shaped base 262. A plurality of retaining features 272 may be formed as a unitary part of the annular wall 270. Each retaining feature 272 may have a pair of fingers 276 extending radially inward toward the conduit 280. An inner edge 282b of each finger 276 may extend radially inward beyond the largest diameter of the conduit 280. An arcuate recess is formed in each of the inner edges 282b of the fingers 276. Each finger 276 is axially and radially aligned with a corresponding one of the radial ridges 266 such that the inner edges 282a, 282b form one, continuous inner edge through the conduit 280 to create a fluted inner surface of the conduit 280. The fingers 276 of each retaining feature 272 may extend axially outward from an arcuate base 274. The arcuate base 274 is spaced axially apart from the inner surface 268 of the disk-shaped base 262. The radially distal edge of each arcuate base 274 extends radially beyond the radially distal edge of the annular wall 270, thereby creating an annular channel 278 between the arcuate bases 274 and the inner surface 268.

With this understanding of the various components and structures of the drive mount system 100, connection of a storage drive 300 to the mounting bracket 200 is shown in FIGS. 5, 6A, 6B, and 7. The mounting bracket 200 is placed over the storage drive 300 as shown in FIG. 5 such that the sidewalls 202 of the mounting bracket 200 are aligned with and adjacent to the sides of the storage drive with pluralities of mounting holes 302. Each sidewall 202 has at least two fastener apertures 228 in alignment with the mounting holes 302 of the storage drive 300, ideally corresponding to mounting holes 302 spaced apart laterally. As is apparent in the figures, the fastener apertures 228 are significantly larger in diameter than the mounting holes 302 and also larger than the diameter of the shaft 246 of each of the fasteners 240. The grommets 260 are designed to fit within the fastener apertures 228 and snugly receive the shaft 246 of the fasteners 340.

As depicted in FIGS. 5 and 7, the grommets 260 resiliently insert through the fastener apertures 228 such that the edges defining the fastener apertures 228 in the sidewalls 202 seat snugly within the annular channel 278. The spaces between the radial ridges 266 and the fingers 276 of the grommets 260 provide greater flexibility for insertion of the grommets 260 through the fastener apertures 228. Each grommet 260 is thus retained in a respective fastener aperture 228 by the arcuate bases 274 seating against the interior face 204 of the sidewall 202 and the inner surface 268 of the disk-shaped base 262 seating against the outer surface 264 of the disk-shaped base 262.

A fastener 240 may then be inserted into the conduit 280 of the grommet 260. The outer diameter of the shaft 246 of the fastener 240 is generally congruent with the inner diameter of the conduit 280 as defined by the inner edges 282 of the radial ridges and the fingers 276, such that the shaft 246 is snugly held within the conduit 280 of the grommet 260. As indicated in FIGS. 3 and 4B, the shaft 246 may define an annular detent 248 on the outer surface thereof. The fingers 276 of the grommet 260 define corresponding arcuate recesses 284 as shown, which align in axial distance from the interior face 204 of the sidewall 202 when the fastener 240 is fully seated in the grommet 260 such that the flange 244 of the fastener 240 is flush with the outer surface 264 of the disk-shaped base 262. The annular detent 248 thus seats within the arcuate recesses 284 to resist axial movement of the fastener 240 when seated in the grommet 260. The resilient material of the grommets 260 further provides for shock resistance and vibrational isolation for the storage drive 300, which can aid in performance and improve the life of the storage drive 300.

As shown in FIG. 5, the pin 250 extends axially beyond the distal ends of the fingers 276 of the grommet 260. When mating the storage drive 300 and the mounting bracket, the fasteners 240 would be removed from the grommets 260. The extension of the grommets 260 beyond the interior face 204 of the sidewalls 202 can be designed to be congruent with the distance the buttresses 224 (and/or the counterforts 226) extend outward from the interior face 204. When the storage drive 300 is inserted into the mounting bracket 200, the buttresses 224 may interface with the sides of the storage drive 300. The mounting holes 302 in the storage drive 300 are aligned with the conduits 280 of the grommets 260 seated in the fastener apertures 228. The fasteners 240 may then be pushed into the grommets 260 such that the pins 250 extend into and seat snugly within the mounting holes 302 of the storage drive 300.

The buttresses 224 ensure that the sidewalls 202 remain parallel with each other and to the sides of the storage drive 300 so that the pins remain in axial alignment with the mounting holes 302 during insertion. It may be appreciated that an installer can also hold the mounting bracket 200 with the storage drive 300 between the sidewalls 202 in one hand, applying pressure against the sidewalls 202 to press the buttresses 224 against the storage drive 300. In this way, the storage drive 300 can easily be held in place within the mounting bracket 200 and in alignment with the fastener apertures 228 with one hand while the installer uses the other hand to push the fasteners 240 into place. This substantially eases the installation burden resulting from needing one hand to hold a screw, a second hand to hold a screwdriver, and leaving no ability to hold the storage drive in place with respect to a mounting structure within computing device.

Notably, the head 242, the flange, and the shaft 246 forming a portion of the fastener 240 are much larger than the pin 250, which is sized to fit within the mounting holes 302 of the storage drive 300. The typical mounting screws for a storage drive 300 are tiny and difficult to hold and work with. Tiny screwdrivers are also needed for installation. The head 242, flange 244, and shaft 246 are larger and allow an installer to easily hold and manipulate the fasteners 240 between a thumb and finger. The fasteners 240 are merely pushed through the grommets 260 and into the mounting holes 302 by hand-no screwing is necessary. A fastener 240 can also be removed by hand-merely by grasping the flange 244 and pulling the fastener out of the mounting hole 302 and grommet 260. If the fastener 240 is difficult to remove by pulling, a flat head screwdriver can be placed under the flange 244 to easily pry the fastener 240 loose.

Once the storage drive 300 is fixed to the mounting bracket 200 with the fasteners 240, the combined drive mount system 100 can then be mounted within the housing 400 of a computing device as depicted in FIGS. 8A and 8B. In this example implementation, the housing 400 is designed to cooperate with the drive mount system 100. The housing 400 is composed of a housing cover 402 and a housing base 404. A plurality of raised pads 406 defining bottom slots 408 are formed in the housing base 404. (See also FIG. 1.) As indicated in the figures, the bottom slots 408 define a rectangular trough pattern corresponding to the form of the bottom tabs 214. The raised pads 406 are located in corresponding positions on the housing base 404 such that the drive mount system 100 can be placed upon the housing base 404 and the bottom tabs 214 align with and seat within the bottom slots 408.

For at least one implementation, the pedestals 216 are similarly designed to cooperate with the raised pads 406 to provide stability. The raised pads 406 fit within the pedestal rabbets 220 and the pedestal tabs 218 extend along the sides of the raised pads 406 to seat against the bottom surface 414 of the housing base 404. The set-off tabs 222 similarly extend from the bottom edges 212 of each of the sidewalls 202 to seat against the bottom surface 414 of the housing base 404 to provide additional lateral stability to the drive mount system 100 along the length of the sidewalls 202.

The housing cover 402 can then be placed over the housing base 404. In this example implementation, the housing cover 402 defines a plurality of top slots 410 aligned with each of the top tabs 210 on the mounting bracket 200. The top tabs 210 thus slide within the top slots 410 of the housing cover 402 and seat against a top surface 416 of the interior of the housing cover 402 to hold the drive mount system 100 securely within the housing 400.

In the example implementation, the housing cover 402 is further formed with a plurality of fastener retainers 412 extending downward from the top surface 416 of the housing cover 402. Each of the fastener retainers 412 is in alignment with corresponding fastener apertures 228 within the sidewalls 202. The fastener retainers 412 extend downward at least as far as the heads 242 of the fasteners 240 and are positioned to gently interface with the heads 242 to counteract any forces that may cause the fasteners 240 to move out of engagement with the mounting holes 302 in the storage drive 300. The fastener retainers 412 may be designed to flex slightly to allow for case of placement of the housing cover 402 over the drive mount system 100.

The combination of the structures formed on the housing cover 402 and the housing base 404 thus align with corresponding features of the drive mount system 100 to hold the drive mount system 100 securely in place within the housing without screws or other hardware that is time consuming to install and remove. As is apparent, storage drive 300 can be easily mounted within the mounting bracket 200 with two hands and no tools, and the completed drive mount system 100 can also be easily installed within a corresponding housing with one hand and without tools. The time required for original installation and replacement of a storage drive is greatly reduced.

Based on design considerations, the components described above may be of substantially different shape than depicted in the figures, while still operating in the same or an equivalent manner. Directional references e.g., upper, lower, inner, outer, upward, downward, left, right, lateral, front, back, top, bottom, above, below, vertical, horizontal, clockwise, counterclockwise, proximal, and distal are used for identification purposes to aid the reader's understanding of the claimed subject matter, and do not create limitations, particularly as to the position, orientation, or use of the mounting system and its components.

Connection references, e.g., attached, coupled, connected, and joined are to be construed broadly and may include intermediate members between a collection of elements and relative movement between elements unless otherwise indicated. As such, connection references do not imply that two elements are directly connected and in fixed relation to each other. In addition, any disclosure of components contained within other components or separate from other components should be considered exemplary because multiple other architectures may potentially be implemented to achieve the same functionality, including incorporating all, most, and/or one or more elements as part of one or more unitary structures and/or separate structures.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." Unless otherwise noted in the claims, stated values shall be interpreted as illustrative and shall not be taken to be limiting.

The term "or" shall be interpreted to mean "and/or" rather than "exclusive or." As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC, or A and B and C.

The above specification, examples and drawings provide a complete description of the structure and use of one or more non-limiting implementations of a lock adapter as defined in the claims. Although various implementations of the claimed subject matter have been described above with a given degree of particularity, or with reference to one or more individual implementations, those skilled in the art could make alterations to the disclosed implementations without departing from the spirit or scope of the claimed subject matter. For example, components may be made of varied materials, and may be colored or patterned for aesthetic purposes or for ease of assembly. Still other implementations are contemplated. It is intended that all matter contained in the above description and shown in the accompanying drawings shall be interpreted as illustrative of particular implementations and not limiting. Changes in detail or structure may be made without departing from the basic elements of the subject matter as defined in the following claims.

What is claimed is:

1. A mounting system, for a storage drive, comprising:
    a mounting bracket including a first sidewall and a second sidewall, parallel to and spaced apart from the first sidewall;
        wherein the first sidewall and the second sidewall define a plurality of apertures therein, spaced apart from one another and configured to align with corresponding threaded mounting apertures defined within the storage drive;
    a plurality of fasteners positioned within respective ones of the plurality of apertures of the first sidewall and the second sidewall, each fastener having a head end and a distal end separated by a shaft having a first diameter;
        wherein the distal end of each fastener is formed as a pin of a second diameter smaller than the first diameter sized for linear, axial insertion within one of the corresponding threaded mounting apertures for an interference fit;
    a saddle extending between the first sidewall and the second sidewall which defines a spatial separation between the first sidewall and the second sidewall;
    a first set of counterforts positioned along a first interface between the saddle and the first sidewall;
    a second set of counterforts positioned along a second interface between the saddle and the second sidewall;
        wherein the first and second sets of counterforts provide reinforcement to the first interface and the second interface;
    a first set of buttresses extending inward from the first sidewall toward a position of the storage drive; and
    a second set of buttresses extending inward from the second sidewall toward the position of the storage drive; and
        wherein the first and second sets of buttresses are sized to engage opposing sides of the storage drive while the first sidewall and the second sidewall maintain a parallel relationship and constant separation distance.

2. The mounting system of claim 1 further comprising:
    a plurality of grommets seated within respective ones of the plurality of apertures of the first sidewall and the second sidewall;
        wherein each of the plurality of grommets defines a conduit through which a respective one of the plurality of fasteners extends such that the shaft seats within the conduit and the pin extends beyond a distal end of the grommet.

3. The mounting system of claim 2,
    wherein the grommets are formed of a resilient material.

4. The mounting system of claim 3,
    wherein the grommets resist shock and vibrationally isolate the storage drive from the mounting bracket.

5. A mounting system for a storage drive of a computing device comprising:
    a housing cover defining a plurality of first receiving slots;
    a housing base defining a plurality of second receiving slots;
    a mounting bracket including:
        a first sidewall and a second sidewall, parallel to and spaced apart from the first sidewall,
            wherein the first sidewall and the second sidewall define a plurality of apertures therein, spaced apart from one another and configured to align with corresponding threaded mounting apertures defined within the storage drive;

a plurality of first tabs extending from a top edge of the first sidewall and a top edge of the second sidewall, wherein the first tabs are positioned to align with and seat within corresponding ones of the first receiving slots; and a plurality of second tabs extending from a bottom edge of the first sidewall and a bottom edge of the second sidewall, wherein the second tabs are positioned to align with and seat within corresponding ones of the second receiving slots; and a plurality of fasteners, positioned within respective ones of the plurality of apertures of the first sidewall and the second sidewall, each fastener having a head end and a distal end separated by a shaft having a first diameter;

wherein the distal end of each fastener is formed as a pin of a second diameter smaller than the first diameter sized for linear, axial insertion within one of the corresponding threaded mounting apertures for an interference fit.

6. The mounting system of claim 5 further comprising:
a saddle extending between the first sidewall and the second sidewall which defines a spatial separation between the first sidewall and the second sidewall.

7. The mounting system of claim 6 further comprising:
a first set of counterforts positioned along a first interface between the saddle and the first sidewall and
a second set of counterforts positioned along a second interface between the saddle and the second sidewall;
wherein the first and second sets of counterforts provide reinforcement to the first interface and the second interface.

8. The mounting system of claim 5 further comprising:
a first set of buttresses extending inward from the first sidewall toward a position of the storage drive; and
a second set of buttresses extending inward from the second sidewall toward the position of the storage drive,
wherein the first and second sets of buttresses are sized to engage opposing sides of the storage drive while the first sidewall and the second sidewall maintain a parallel relationship and constant separation distance.

9. The mounting system of claim 5 further comprising:
a plurality of grommets seated within respective ones of the plurality of apertures of the first sidewall and the second sidewall;
wherein each of the plurality of grommets defines a conduit through which a respective one of the plurality of fasteners extends such that a shaft seats within the conduit and the pin extends beyond a distal end of the grommet.

10. The mounting system of claim 9,
wherein the grommets are formed of a resilient material.

11. The mounting system of claim 10,
wherein the grommets resist shock and vibrationally isolate the storage drive from the mounting bracket, the housing cover, and the housing base.

12. The mounting system of claim 5,
wherein one or more of the housing cover and the housing base further comprises a fastener retainer extending therefrom and positioned to interface with the head of one of the fasteners to prevent axial movement of the fastener.

13. The mounting system of claim 5,
wherein the first sidewall and the second sidewall are further formed with a plurality of tabs sized and positioned to interface with a bottom surface of the base housing to provide lateral support to the first sidewall and the second sidewall when the second tabs seat within the second receiving slots.

14. A method for mounting a storage drive within a housing of a computing device comprising:
providing the storage drive with a plurality of threaded mounting apertures defined within opposing sidewalls of the storage drive;
providing a mounting bracket including:
a first sidewall;
a second sidewall, parallel to and spaced apart from the first sidewall;
wherein the first sidewall and the second sidewall define a plurality of apertures therein, spaced apart from one another and configured to align with corresponding threaded mounting apertures defined within the storage drive;
a saddle extending between the first sidewall and the second sidewall which defines a spatial separation between the first sidewall and the second sidewall;
a first set of counterforts positioned along a first interface between the saddle and the first sidewall;
a second set of counterforts positioned along a second interface between the saddle and the second sidewall;
wherein the first and second sets of counterforts provide reinforcement to the first interface and the second interface;
a first set of buttresses extends inward from the first sidewall toward a position of the storage drive;
a second set of buttresses extends inward from the second sidewall toward the position of the storage drive; and
wherein the first and second sets of buttresses are sized to engage opposing sides of the storage drive while the first sidewall and the second sidewall maintain a parallel relationship and constant separation distance;
inserting a plurality of fasteners within respective ones of the plurality of apertures of the first sidewall and the second sidewall, each fastener having a head end and a distal end separated by a shaft having a first diameter;
wherein the distal end of each fastener is formed as a pin of a second diameter smaller than the first diameter; and
pushing each pin of the plurality of fasteners axially within one of the corresponding threaded mounting apertures of the storage drive for an interference fit; and
holding the storage drive between the buttresses while inserting the plurality of fasteners and pushing respective pins.

15. The method of claim 14 further comprising:
inserting each a plurality of grommets to seat within respective ones of the plurality of apertures of the first sidewall and the second sidewall;
wherein each of the plurality of grommets defines a conduit through which a respective one of the plurality of fasteners extends such that the shaft seats within the conduit and the pin extends beyond a distal end of the grommet.

16. The method of claim 15,
wherein the grommets resist shock and vibrationally isolate the storage drive from the mounting bracket.

17. The method of claim 15,
wherein the grommets are formed of a resilient material.

18. The method of claim 15,
wherein the housing includes:
- a housing cover defining a plurality of first receiving slots;
- a housing base defining a plurality of second receiving slots;
- wherein a top edge of the first sidewall and a top edge of the second sidewall include a plurality of first tabs extending therefrom and positioned to align with corresponding ones of the first receiving slots;

wherein a bottom edge of the first sidewall and a bottom edge of the second sidewall include a plurality of second tabs extending therefrom and positioned to align with corresponding ones of the second receiving slots; and wherein the method further comprises:
- seating the plurality of first tabs within corresponding ones of the first receiving slots; and
- seating the plurality of second tabs within corresponding ones of the second receiving slots.

19. The method of claim 14,
wherein the housing includes:
- a housing cover defining a plurality of first receiving slots;
- a housing base defining a plurality of second receiving slots;
- wherein a top edge of the first sidewall and a top edge of the second sidewall include a plurality of first tabs extending therefrom and positioned to align with corresponding ones of the first receiving slots;

wherein a bottom edge of the first sidewall and a bottom edge of the second sidewall include a plurality of second tabs extending therefrom and positioned to align with corresponding ones of the second receiving slots; and wherein the method further comprises:
- seating the plurality of first tabs within corresponding ones of the first receiving slots; and
- seating the plurality of second tabs within corresponding ones of the second receiving slots.

* * * * *